US006731612B1

United States Patent
Koss

(10) Patent No.: US 6,731,612 B1
(45) Date of Patent: *May 4, 2004

(54) LOCATION-BASED WEB BROWSING

(75) Inventor: Michael C. Koss, Bothell, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,819

(22) Filed: Jun. 29, 1998

(51) Int. Cl.[7] .............................. H04B 7/00; H04B 7/005
(52) U.S. Cl. ...................... 370/310; 370/313; 370/420; 370/427; 455/461; 340/905; 340/988
(58) Field of Search ............................ 455/432, 461, 455/463; 707/102, 103, 104; 340/903, 905, 988; 709/245; 370/420, 427, 310, 313, 901, 902, 912, 913

(56) References Cited

U.S. PATENT DOCUMENTS

| 5,678,194 A | * 10/1997 | Grube et al. ............... 455/54.1 |
| 5,930,801 A | * 7/1999 | Falkenhainer et al. ...... 707/103 |
| 5,944,790 A | * 8/1999 | Levy .......................... 709/218 |
| 6,014,090 A | * 1/2000 | Rosen et al. ................. 340/905 |
| 6,047,327 A | * 4/2000 | Tso et al. ..................... 709/232 |
| 6,058,423 A | * 5/2000 | Factor ......................... 709/226 |
| 6,119,171 A | * 9/2000 | Alkhatib ..................... 709/245 |
| 6,138,142 A | * 10/2000 | Linsk .......................... 709/203 |
| 6,154,172 A | * 11/2000 | Piccionelli et al. ......... 342/357.1 |
| 6,182,113 B1 | * 1/2001 | Narayanaswami .......... 709/203 |
| 6,240,369 B1 | * 5/2001 | Foust ............................. 702/3 |
| 6,256,498 B1 | * 7/2001 | Ludwig ....................... 455/433 |

OTHER PUBLICATIONS

CellPort Labs Inc. publication listing in the Table of Contents: CellPort Labs; Mobile Web White Paper; Mobile Web FAQ; News on CellPort; Daimler-Benz's The Internet Multimedia on Wheels; SiRF Technology; Other Articles and Papers "Travel time studies on signalized highways using GPS" and "Real World Agent: A Linkage between the Internet and the Real World," Copyright 1997 CellPort Labs Inc.

* cited by examiner

Primary Examiner—Hassan Kizou
Assistant Examiner—Joe Logsdon
(74) Attorney, Agent, or Firm—Lee & Hayes, PLLC

(57) ABSTRACT

Described herein is a hyperlink browsing system that includes a plurality of mobile hyperlink browsers that communicate wirelessly with a plurality of servers having geographically-dependent information content. The hyperlink browsers have access to positioning receivers that generate varying geographical coordinates indicating the varying locations of the hyperlink browsers; When submitting HTTP requests, the hyperlink browsers include the geographical coordinates. The servers recognize the parameters and customize returned content in accordance with the geographic locations of the requesting users.

22 Claims, 3 Drawing Sheets

LOCATION-BASED WEB BROWSING

TECHNICAL FIELD

This invention relates to mobile Web browsers, and to the utilization of GPS-generated geographical information in conjunction with such Web browsers.

BACKGROUND OF THE INVENTION

Automobile "stereos" are gradually being replaced by more complex components that have numerous capabilities in addition to the capabilities of playing music from over-the-air radio broadcasts and from tapes and CDs. For example, automobile accessories are being designed that incorporate such features as cellular telephones and Internet connectivity. A US Patent Application entitled "Vehicle Computer System," filed by Microsoft Corporation on Nov. 29, 1995, having Ser. No. 08/564,586 (hereby incorporated by reference), describes one such automobile accessory. Generally, many systems such as this are similar to desktop computers, with added multimedia capabilities and other capabilities related to the automotive environment.

Mobile automobile computers sometimes incorporate hardware for determining the absolute geographical position of the computer or automobile. Currently, this is accomplished using a positioning receiver that receives satellite transmissions and processes such transmissions to determine geographical coordinates (such as longitude and latitude). The system currently in use is referred to as the Global Positioning System (GPS) and is maintained by the government of the United States. Low cost receivers are available for use with various types of mobile computers.

The most obvious use of positioning capabilities is in conjunction with mapping software. Thus, application programs have been developed for showing a user's current position on a scrolling map and for providing driving instructions to a driver based on the driver's current position and a specified geographical objective.

Location data can be exploited even more effectively when a mobile computer also has Internet access. When this is the case, geographical data can be provided by Internet servers and can therefore be drawn from a much larger database.

In addition to these uses of real-time location data, however, the inventors have realized a need and an opportunity for automatically providing mobile Internet users with geographic-specific information as part of their normal Web browsing activities.

SUMMARY OF THE INVENTION

In accordance with the invention, a client's Web browser is configured to include location data in its HTTP requests. The responding server takes note of the location data and customizes its returned content in accordance with the user's location. Optionally, the server also returns a valid zone indication, indicating an area within which the returned content is valid. Upon leaving this area, the client automatically resubmits its request to obtain new information appropriate for the new user's location.

The invention effectively customizes a user's Web browsing experience based on his or her physical location, without requiring any special steps on the part of the user. In addition, the user does not need additional application programs such as have been needed in the past. Rather, the work of finding appropriate data is transferred to Web servers.

DETAILED DESCRIPTION

Hardware Environment

Figure 1:
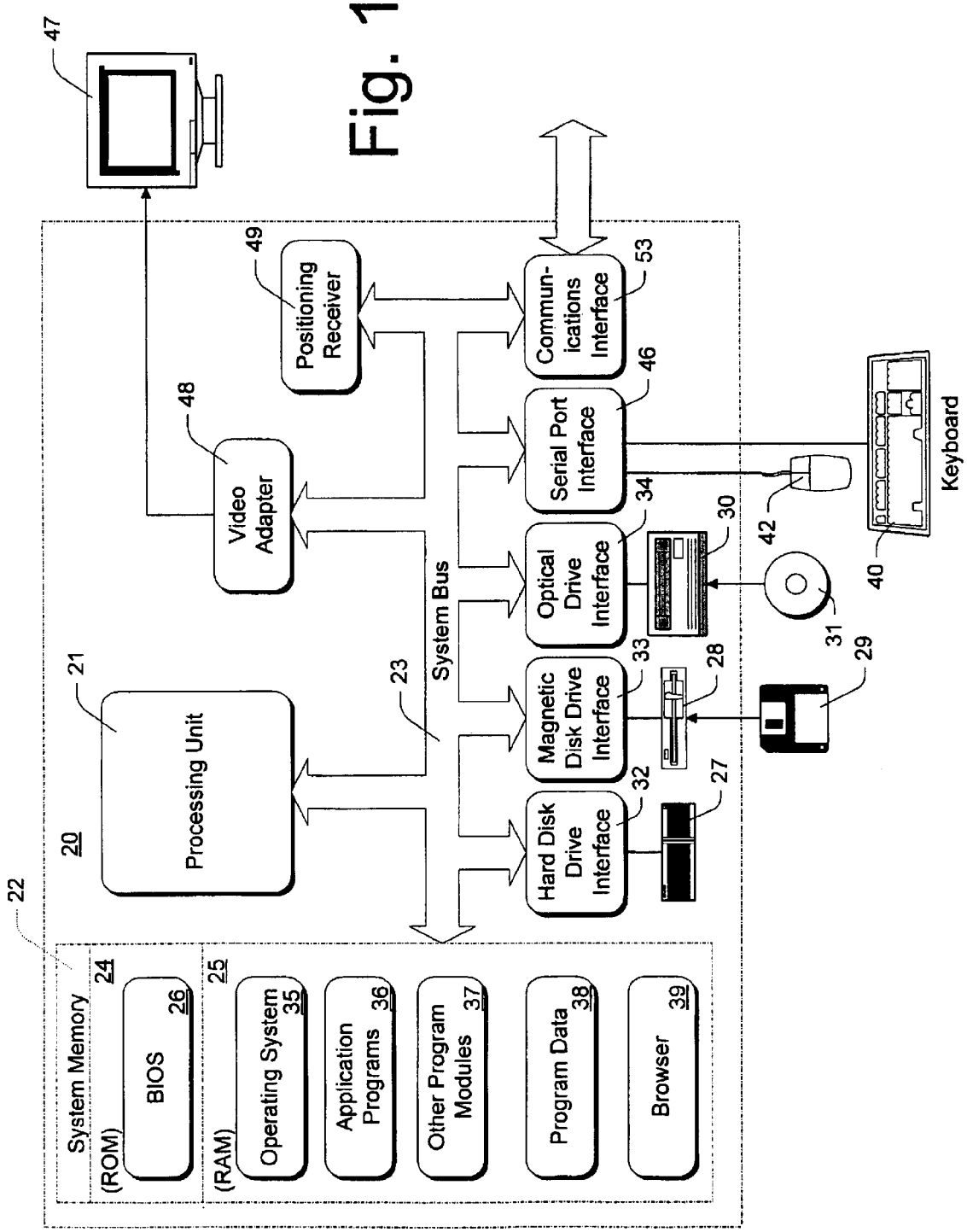
FIGS. 1 and 2 show a mobile computer and network system in accordance with the invention.
Figure 2:
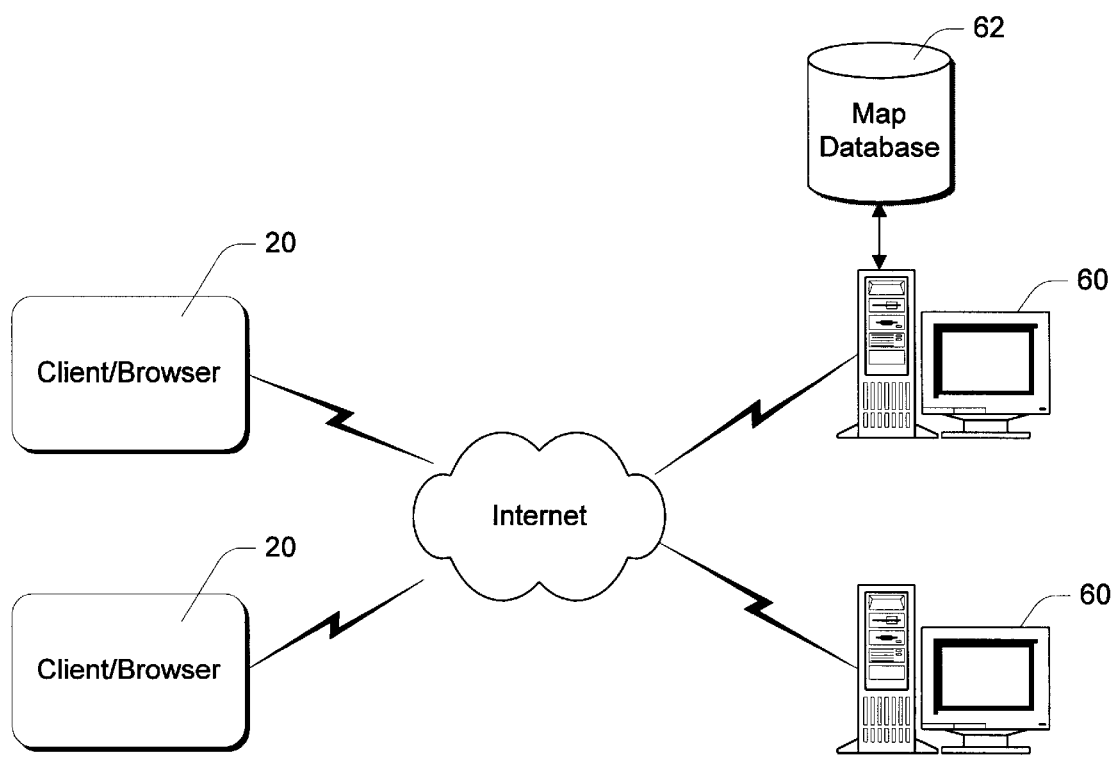

FIGS. 1 and 2 illustrate a mobile computer and network system in accordance with the invention. In the described embodiment, the invention is implemented at least in part with computer-executable instructions, such as program modules, that are executed by a mobile computer that is particularly adapted for the automotive, handheld, or other mobile environments. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, and the like.

An exemplary system for implementing the invention includes a mobile computer 20, including a microprocessor or other processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within computer 20, such as during start-up, is stored in ROM 24. Computer 20 optionally includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. Other configurations might include different types of computer-readable media, such as magnetic cassettes, magnetic disks, flash memory cards, and digital video disks.

A number of program modules may be stored on the hard disk, magnetic disk 29 optical disk 31, ROM 24, or RAM 25, including an operating system 35, one or more application programs 36, other program modules 37, and program data 38. Microprocessor 21 is programmed by means of such components, which are stored at different times in the different types of available computer-readable storage media (for purposes of illustration, the program components are shown in RAM in FIG. 1). The invention described herein includes these various types of computer-readable storage media when such media contain instructions or programs for implementing the described steps in conjunction with a microprocessor or other data processor. The invention also includes the system or computer itself when programmed according to the methods and techniques described below.

The application programs of the mobile computer include a hyperlink or Web browser 39. The hyperlink browser is similar to popular browsers such as Microsoft's Internet Explorer. The hyperlink browser is responsive to user selection of hyperlinks to send HTTP resource requests to servers and to render content that is returned in response to the HTTP requests. The nature of such requests and responses will be described more fully below.

A user may enter commands and information into the personal computer 20 through input devices such as a keypad or keyboard 40, a pointing device 42, and/or a touch-sensitive display panel (not shown). Other input devices (not shown) may include a microphone, joystick, game pad, or the like. The input devices can be connected to the processing unit 21 through a serial port interface 46 that is coupled to the system bus, but may be connected by other interfaces, such as a parallel port, game port, or a universal serial bus (USB).

A flat-panel monitor 47 or other type of display device is also connected to the system bus 23 via an interface, such as a video adapter 48. In addition to the monitor, the computer might include other peripheral output devices that are not shown, such as speakers. In addition, the computer might include interfaces to various automobile components such as diagnostics modules and the like.

Mobile computer 20 includes a positioning receiver 49 that generates varying geographical coordinates indicating the varying current location of computer 20 and its user. The receiver is preferably a GPS receiver and communicates with processor 21 through the bus structure already described or by some other conventional means such as a serial communications port.

Even though it is mobile, computer 20 operates in a networked environment using a logical connection to one or more remote computers through a wide-area network such as the public Internet. In accordance with the invention, mobile computer 20 has a wireless communications interface or adapter 53 for communications with a remote server over a wireless medium. Adapter 53 might comprise a conventional modem in conjunction with a cellular telephone, or some other type of communications adapter using digital cellular technology.

Internet Environment

FIG. 2 shows a plurality of mobile computers 20 configured to communicate through the Internet with a plurality of servers or server computers 60. Each server computer comprises a conventional computer such as a personal or desktop computer including a processor and various types of computer-readable storage media.

In the described embodiment, each server computer is configured as an Internet or World Wide Web server. The World Wide Web (WWW or Web) of the Internet is a body of hyperlinked multimedia content referred to as "hypermedia." "Hypermedia" is a metaphor for information in which text, images, sounds, and actions are linked together in a complex, non-sequential web of associations that permit a user to "browse" or "navigate" through related topics, regardless of the presented order of the topics. The term "hypermedia" arises from "hypertext," a term which was originally coined to describe text-based documents including links to other such documents to form a non-sequential web of associated ideas.

Hypermedia content is commonly organized as individual "documents" or "pages" with embedded control information. The embedded control information includes formatting specifications, indicating how a document is to be rendered. In addition, such control information can include links or "hyperlinks": symbols or instructions indicating where to find other related Web resources or documents (files) on the Internet. A hyperlink from one hypermedia topic to another is normally established by the author of a hypermedia document, although some applications allow users to insert hyperlinks to desired topics.

A document or page often corresponds to a single file that is retrievable either locally or through a network. Increasingly, however, servers compile content dynamically from a variety of data sources, based on variable information provided with resource requests.

An application program referred to as a Web browser, also referred to herein as a hyperlink browser, is used to retrieve and render hypermedia content from the WWW. A Web browser allows a user to browse or navigate through the Web and to thereby find items of specific interest to the user. The terms "browse" and "navigate" indicate a process of following a sequence of hyperlinks through a plurality of different documents or other Web resources.

In response to activation or selection of a particular hyperlink, a Web browser loads and renders the file or other multimedia content specified by the hyperlink. In accordance with conventional practice, such content typically contains hyperlinks to additional media resources (thus creating the "web" of inter-linked documents or resources). A user can select any such hyperlink and in response the Web browser will load the media resources identified by that hyperlink.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to retrieve and render the document or resource that is targeted by the hyperlink. The target of the hyperlink is specified in the document containing the hyperlink.

Currently, many WWW transactions take place using a protocol referred to as HTTP: hypertext transfer protocol. HTTP is an application-level protocol for distributed, collaborative, hypermedia information systems. HTTP has been in use by the World-Wide Web global information initiative since 1990.

HTTP is used to submit resource requests to network servers and to send responses back to requesting clients. A resource request under HTTP specifies the requested resource or Web content, as well as various other information such as the HTTP version being used. An HTTP response includes the requested content as well as other, optional information. More information regarding the HTTP protocol can be found in a variety of published texts, such as the "Illustrated Guide to HTTP," by Paul Hethmon (ISBN 0-13-858226-2), which is hereby incorporated by reference.

Geographically-Dependent Content

Servers 60 provide hyperlinked Web content on a wide-area network such as the Internet. FIG. 2 shows a database 62, associated with one of the servers, containing such content. In accordance with the invention, at least some of the hyperlinked content is geographically-dependent. Geographically-dependent content is content that is or can be tailored to be especially appropriate for users that are located at a particular geographical location or within a particular geographical zone. As an example, content describing restaurants is geographically-dependent if it is or can be customized to show only those restaurants within a defined distance of an arbitrary geographical location.

The servers accept HTTP resource requests from a plurality of mobile computers or clients, wherein the mobile clients have locations that vary with time. In response to certain types of requests, the servers select and return different geographically-dependent content to the requesting clients, depending on geographical coordinates specified in the HTTP resource requests.

Specifically, the hyperlink browser of a particular mobile computer includes geographical coordinates of that mobile computer in HTTP requests made by the hyperlink browser. These coordinates are embedded in the HTTP requests automatically, without any intervention by a user. The coordinates are embedded in the HTTP request as part of a special request-header field named "GPSLocation". An example format of such a header field is as follows:

GPSLocation: 46.21 N, 85.30 W where the first number indicates degrees of latitude and the second number indicates degrees of longitude. An example of a full HTTP request in accordance with the invention is as follows:

GET/mymap.asp HTTP/1.0

Host: mobile.msn.com

Accept: image/gif, image/x-xbitmap, image/jpeg, image/pjpeg, */*

User-Agent: Mozilla/4.0 (compatible; MSMapper 1.0; Windows CE)

GPSLocation: 46.21 N, 85.30 W

This request specifies the resource "/mymap.asp" from server "mobile.msn.com". In response to any given request that includes the GPSLocation field, a server can respond in any way that has been determined to be appropriate. The field will be simply ignored for some resources and on some servers. Other servers will have certain content or resources that are customizable based on the specified geographical coordinates, and will return such customized content.

Figure 3:
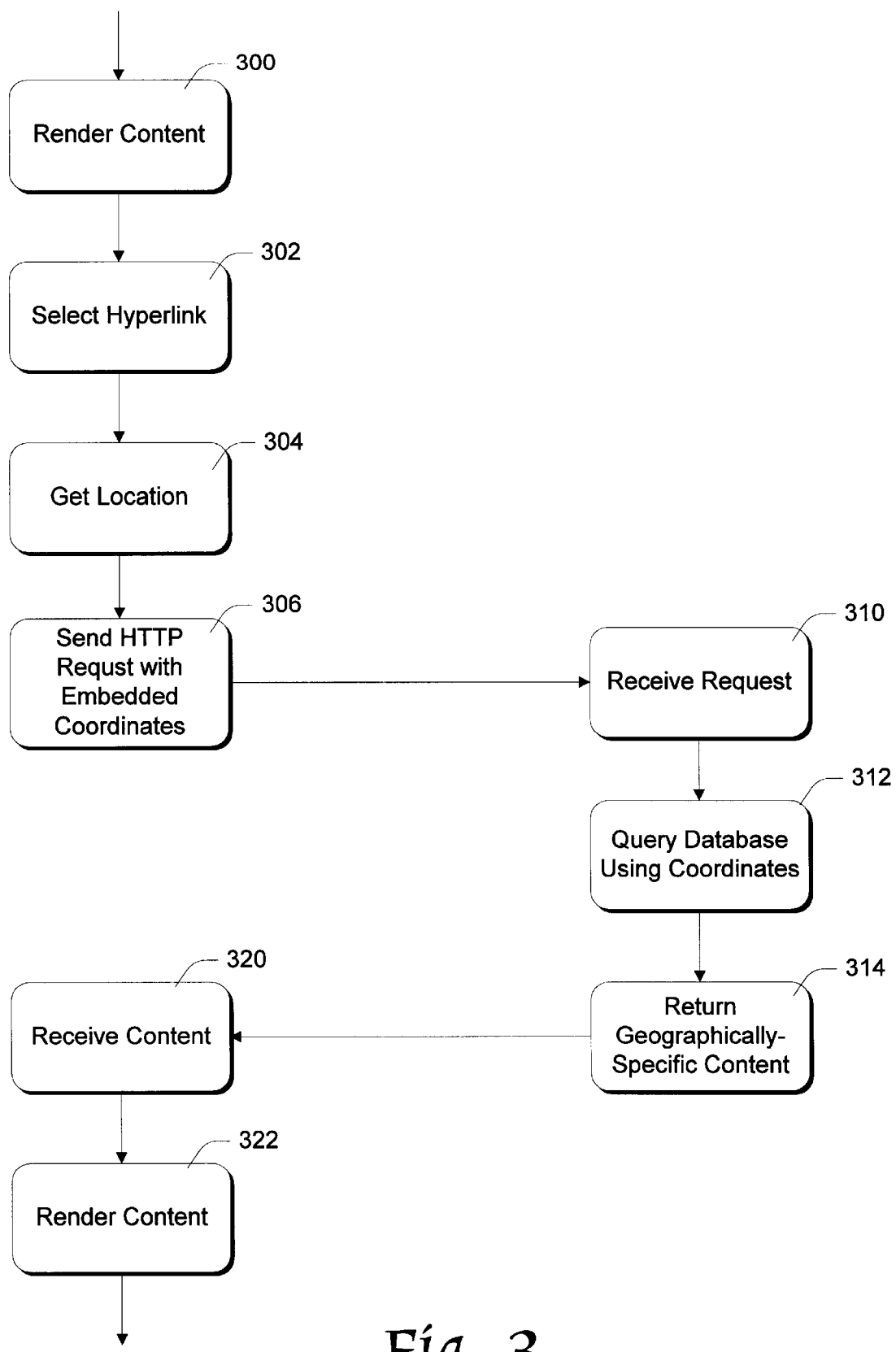
FIG. 3 is a flowchart illustrating methodological aspects of the invention.

FIG. 3 illustrates methodological aspects of the invention. The steps illustrated on the left-hand side of FIG. 3 are performed by a mobile client and its Web browser. The steps on the right-hand side of FIG. 3 are performed by a Web server.

A step 300, performed by the client, comprises rendering hyperlinked Web content containing one or more hyperlinks. Step 302 comprises allowing a user to select a hyperlink from the rendered hyperlinked content. Step 304 comprises obtaining current geographical coordinates of the mobile computer from the computer's GPS receiver. Step 306 comprises sending an HTTP request to a hyperlinked content network and eventually to a server, wherein the HTTP request includes the embedded GPSLocation parameters specified above.

Step 310, performed by a server, comprises receiving the HTTP request. Step 312 comprises querying a database or performing some other procedure to obtain or create content that is appropriate for the location indicated in the HTTP request. Step 314 comprises returning the content to the mobile computer.

Step 320, performed by the mobile client, comprises receiving the content. Step 322 comprises rendering the returned content.

The servers can utilized the geographic information in various ways depending on the nature of the resource being requested. In many cases, the geographic coordinates will be utilized to provide data about the area surrounding the location of the mobile client: nearby restaurants, merchants, points of interest, maps of the area, etc.

As another example, it is becoming quite common for servers to return a host of advertising supplements in conjunction with requested content. Such advertising supplements may be displayed in additional screen areas or as part of the returned graphical content. In accordance with the invention, a server can be configured to select such advertising supplements based on particular clients' actual locations. With this type of selection, a user might therefore be exposed primarily to advertisements from merchants in the general geographical area.

Using the techniques described above, a server can support discussions regarding certain geographic locations. Users are directed to the appropriate discussion depending on their current geographic locations. A server might also facilitate a "chat" feature that connects various users within specified geographical areas.

As a further feature, servers can return optional "zone" parameters with the returned content, indicating geographical zones within which the returned geographically-dependent content is considered valid. When displaying content associated with such zone parameters, a Web browser continually monitors its location and compares it to the indicated "valid zone" specified for the content. When the Web browser leaves the valid zone, the browser invalidates the content. More specifically, it resubmits the HTTP request that generated the content to obtain new content that is appropriate for the new location of the browser.

A valid zone specifications is preferably specified as a radius, indicating a radius from the geographical coordinates of the original HTTP request within which returned geographically-dependent content is considered valid. As an example, the header of an HTTP response might include the GPSLocation field described above, reflecting the coordinates given in the request, and a GPSValidRadius field as follows:

GPSLocation: 46.21 N, 85.30 W

GPSValidRadius: 1.6 km

The associated content would be valid as long as the client was within 1.6 km of the coordinates given by the GPSLocation field.

To provide privacy when desired, the Web browser allows the user to turn off the features described above, so that location coordinates are not embedded in HTTP requests. Furthermore, the Web browser allows a user to specify arbitrary locations, independent of actual locations, that are specified in HTTP requests under the GPSLocation field. This allows a user to retrieve information about a specific location without really being there.

Conclusion

The invention allows GPS coordinates to be utilized without requiring client computers to have dedicated application programs for using such coordinates. In the past, for instance, a user needed to run a special program to coordinate the use of GPS coordinates with databases of geographic-dependent topics. In accordance with the invention, however, a user's browser automatically inserts GPS coordinates in HTTP requests, allowing Web servers to assume responsibility for customizing information based on those parameters.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A hyperlink browsing system comprising:
   a plurality of servers that provide hyperlinked content on a wide-area network, wherein at least some of the hyperlinked content is geographically-dependent;

a plurality of mobile clients that communicate with the wide-area network over a wireless communications medium, the mobile clients having varying locations;

the mobile clients having positioning receivers that generate varying geographical coordinates indicating the varying locations of the mobile clients;

the mobile clients having hyperlink browsers that are responsive to user designations of hyperlinked content to send HTTP requests to servers and to render content that is returned in response to the HTTP requests;

wherein the hyperlink browser of a particular mobile client includes current geographical coordinates of that mobile client in HTTP requests;

wherein the servers select and return different geographically-dependent content to the hyperlink browsers in response to the HTTP requests depending on the geographical coordinates in the HTTP requests; and wherein the servers return valid zone specifications in conjunction with returned geographically-dependent content, the valid zone specifications indicating geographical zones within which the returned geographically-dependent content is considered valid.

2. A hyperlink browsing system comprising:

a plurality of servers that provide hyperlinked content on a wide-area network, wherein at least some of the hyperlinked content is geographically-dependent;

a plurality of mobile clients that communicate with the wide-area network over a wireless communications medium, the mobile clients having varying locations;

the mobile clients having positioning receivers that generate varying geographical coordinates indicating the varying locations of the mobile clients;

the mobile clients having hyperlink browsers that are responsive to user designations of hyperlinked content to send HTTP requests to servers and to render content that is returned in response to the HTTP requests;

wherein the hyperlink browser of a particular mobile client includes current geographical coordinates of that mobile client in HTTP requests;

wherein the servers select and return different geographically-dependent content to the hyperlink browsers in response to the HTTP requests depending on the geographical coordinates in the HTTP requests; and wherein the servers return valid radii specifications in conjunction with returned geographically-dependent content, each valid radius specification indicating a radius from the geographical coordinates of an HTTP request, within which a returned geographically-dependent content is considered valid.

3. A hyperlink browsing system comprising:

a plurality of servers that provide hyperlinked content on a wide-area network, wherein at least some of the hyperlinked content is geographically-dependent;

a plurality of mobile clients that communicate with the wide-area network over a wireless communications medium, the mobile clients having varying location;

the mobile clients having positioning receivers that generate varying, geographical coordinates indicating the vary locations of the mobile clients;

the mobile clients having hyperlink browsers that are responsive to user designations of hyperlinked content to send HTTP requests to servers and to render content that is returned in response to the HTTP requests;

wherein the hyperlink browser of a particular mobile client includes current geographical coordinates of that mobile client in HTTP requests;

wherein the servers select and return different geographically-dependent content to the hyperlink browsers in response to the HTTP requests depending on the geographical coordinates in the HTTP requests;

wherein the servers return valid zone specifications in conjunction with returned geographically-dependent content, the valid zone specifications indicating geographical zones within which the returned geographically-dependent content is considered valid; and the hyperlink browser of a particular mobile client sends a new resource request when that mobile client leaves the geographical zone specified for particular returned geographically-dependent content.

4. A computer-readable storage medium having stored thereon a hyperlink browser program, the hyperlink browser program being executable by a mobile computer to perform steps comprising:

accepting a designation of hyperlinked content from a user;

obtaining current geographical coordinates of the mobile computer from a global positioning receiver associated with the mobile computer;

in response to user designation of hyperlinked content, sending an HTTP request to a hyperlinked content network over a wireless transmission medium;

including the current geographical coordinates of the mobile computer in the HTTP request; and receiving geographically-dependent content from the hyperlinked content network as a result of the HTTP request, wherein a valid zone specification is returned to the hyperlink browser program conjunction with the geographically-dependent content, the valid zone specification indicating a geographical zone within which the geographically-dependent content is considered valid.

5. A computer-readable storage medium having stored thereon a hyperlink browser program, the hyperlink browser program being executable by a mobile computer to perform steps comprising:

accepting a designation of hyperlinked content from a user;

obtaining current geographical coordinates of the mobile computer from a global positioning receiver associated with the mobile computer;

in response to user designation of hyperlinked content, sending an HTTP request to a hyperlinked content network over a wireless transmission medium;

including the current geographical coordinates of the mobile computer in the HTTP request;

receiving geographically-dependent content from the hyperlinked content network as a result of the HTTP request, wherein a valid zone specification is returned to the hyperlink browser program conjunction with the geographically-dependent content, the valid zone specification indicating a geographical zone within which the geographically-dependent content is considered valid; and sending a new HTTP request when the mobile computer leaves the indicated geographical zone.

6. A computer-readable storage medium having stored thereon a hyperlink browser program, the hyperlink browser program being executable by a mobile computer to perform steps comprising:

accepting a designation of hyperlinked content from a user;

obtaining current geographical coordinates of the mobile computer from a global positioning receiver associated with the mobile computer;

in response to user designation of hyperlinked content, sending an HTTP request to a hyperlinked content network over a wireless transmission medium;

including the current geographical coordinates of the mobile computer in the HTTP request;

receiving geographically-dependent content from the hyperlinked content network as a result of the HTTP request, wherein a valid radius is returned to the hyperlink browser program conjunction with the geographically-dependent content, the valid radius indicating a radius from the current geographical coordinates within which the geographically-dependent content is considered valid; and invalidating the geographically-dependent content when the mobile computer leaves an area encompassed by the radius.

7. A mobile information system comprising:

a mobile hyperlink browser that communicates with one or more remote servers, wherein a plurality of hyperlinked content is available from said one or more remote servers, at least some of the hyperlinked content being geographically-dependent;

wherein the mobile hyperlink browser sends resource requests to the one or more servers;

wherein at least some of the resource requests from the mobile hyperlink browser include geographical coordinates indicating the current location of the mobile hyperlink browser;

wherein the servers return valid zone specifications in conjunction with returned geographically-dependent content, the valid zone specifications indicating geographical zones within which the returned geographically-dependent content is considered valid; and the mobile hyperlink browser invalidates returned geographically-dependent content when the mobile hyperlink browser leaves the geographical zone specified for that returned geographically-dependent content.

8. A mobile information system comprising:

a mobile hyperlink browser that communicates with one or more remote servers, wherein a plurality of hyperlinked content is available from said one or more remote servers, at least some of the hyperlinked content being geographically-dependent;

wherein the mobile hyperlink browser sends resource requests to the one or more servers;

wherein at least some of the resource requests from the mobile hyperlink browser include geographical coordinates indicating the current location of the mobile hyperlink browser;

wherein the servers return valid zone specifications in conjunction with returned geographically-dependent content, the valid zone specifications indicating geographical zones within which the returned geographically-dependent content is considered valid; and the mobile hyperlink browser sends a new resource request when the mobile hyperlink browser leaves the geographical zone specified for particular returned geographically dependent content.

9. A mobile information system comprising:

a computer;

a wireless communications interface that provides communications between the computer and a remote server over a wireless communications medium;

a hyperlink browser that executes on the computer, the hyperlink browser sending resource requests to the remote server over the wireless communications medium;

a positioning receiver that generates varying geographical coordinates indicating the varying location of the computer;

wherein the hyperlink browser includes the varying geographical coordinates in at least some of the resource requests;

wherein the remote server returns a valid zone specification in conjunction with returned geographically-dependent content, the valid zone specification indicating a geographical zone within which the returned geographically-dependent content is considered valid; and the hyperlink browser invalidates returned geographically-dependent content when the computer leaves the geographical zone specified for that returned geographically-dependent content.

10. A mobile information system comprising:

a computer;

a wireless communications interface that provides communications between the computer and a remote server over a wireless communications medium;

a hyperlink browser that executes on the computer, the hyperlink browser sending resource requests to the remote server over the wireless communications medium;

a positioning receiver that generates varying geographical coordinates indicating the varying location of the computer;

wherein the hyperlink browser includes the varying geographical coordinates in at least some of the resource requests;

wherein the remote server returns a valid zone specification in conjunction with returned geographically-dependent content, the valid zone specification indicating a geographical zone within which the returned geographically-dependent content is considered valid; and the hyperlink browser sends a new resource request when the computer leaves the geographical zone specified for particular returned geographically-dependent content.

11. A method of browsing hyperlinked content from a mobile browser, comprising;

accepting a designation of hyperlinked content from a user;

obtaining current geographical coordinates of the mobile browser;

in response to the designation of hyperlinked content, sending a resource request to a server over a wireless transmission medium;

including the current geographical coordinates in the resource request;

wherein the server returns a valid zone specification in conjunction with returned geographically-dependent content, the valid zone specification indicating a geographical zone within which the returned geographically-dependent content is considered valid, the method comprising a further step of invalidating the returned geographically-dependent content when the computer leaves the geographical zone specified for the returned geographically-dependent content.

12. A method of browsing hyperlinked content from a mobile browser, comprising:

accepting designation of hyperlinked content from a user;

obtaining current geographical coordinates of the mobile browser;

in response to the designation of hyperlinked content, sending a resource request to a server over a wireless transmission medium;

including the current geographical coordinates in the resource request;

wherein the server returns a valid zone specification in conjunction with returned geographically-dependent content, the valid zone specification indicating a geographical zone within which the returned geographically-dependent content is considered valid, the method comprising a further step of sending a new resource request when the computer leaves the geographical zone specified for particular returned geographically-dependent content.

13. A computer-readable storage medium containing instructions that are executable by a computer to perform steps comprising:

receiving HTTP requests from a plurality of mobile clients, wherein the HTTP requests include geographical coordinates indicating locations of the mobile clients;

in response to the HTTP requests, selecting geographical-dependent content based on the geographical coordinates included in the HTTP requests;

returning the selected geographical-dependent content to the requesting mobile clients; and returning a valid zone specification in conjunction with the returned geographically-dependent content, the valid zone specification indicating a geographical zone within which the returned geographically-dependent content is considered valid.

14. A computer-readable storage medium as recited in claim 13, wherein the valid zone specification is specified as a valid radius specification, the valid radius specification indicating a radius from the location of a mobile client within which the returned geographically-dependent content is considered valid.

15. A computer-readable storage medium as recited in claim 13, wherein the returned geographically-dependent content comprises a listing of mobile users in proximity to requesting mobile clients.

16. A computer-readable storage medium as recited in claim 13, the steps further comprising:

maintaining a database indicating current locations of different mobile clients based on the HTTP requests submitted by said clients;

wherein the returned geographically-dependent content comprises listings of mobile clients that are in proximity to requesting mobile clients.

17. A method of servicing resource requests in a network having hyperlinked content, comprising the following steps:

receiving resource requests from a plurality of mobile clients, wherein the resource requests include geographical coordinates indicating locations of the mobile clients;

in response to the resource requests, selecting geographical-dependent content based on the geographical coordinates included in the resource requests;

returning the selected geographical-dependent content to the requesting mobile clients; and returning a valid zone specification in conjunction with the returned geographically-dependent content, the valid zone specification indicating a geographical zone within which the returned geographically-dependent content is considered valid.

18. A method as recited in claim 17, wherein the valid zone specification is specified as a valid radius specification, the valid radius specification indicating a radius from the location of a mobile client within which the returned geographically-dependent content is considered valid.

19. A method as recited in claim 17, further comprising:

maintaining a database indicating current locations of different mobile clients based on the HTTP requests submitted by said clients;

wherein the returned geographically-dependent content comprises listings of mobile clients that are in proximity to requesting mobile clients.

20. A hyperlink content system, comprising;

one or more servers having hyperlinked content, wherein at least some of the hyperlinked content is geographically-dependent;

the servers being programmed to accept resource requests that specify geographical coordinates of mobile clients;

the servers being programmed to respond to the resource requests by selecting and returning different geographically-dependent content depending on the specified geographical coordinates;

wherein the servers are further programmed to return valid zone specifications in conjunction with the returned geographically-dependent content, each valid zone specification indicating a geographical zone within which the returned geographically-dependent content is considered valid.

21. A hyperlink content system as recited in claim 20, wherein each valid zone specification is specified as a valid radius specification, each valid radius specification indicating a radius from the location of a mobile client within which the returned geographically-dependent content is considered valid.

22. A hyperlink content system as recited in claim 20, further comprising:

a database indicating current locations of different mobile clients based on the HTTP requests submitted by said clients;

wherein the returned geographically-dependent content comprises listings of mobile clients that are in proximity to requesting mobile clients.

* * * * *

UNITED STATES PATENT AND TRADEMARK OFFICE
CERTIFICATE OF CORRECTION

PATENT NO. : 6,731,612 B1
DATED : May 4, 2004
INVENTOR(S) : Koss

It is certified that error appears in the above-identified patent and that said Letters Patent is hereby corrected as shown below:

Title page,
Item [57], ABSTRACT,
Line 7, replace ";" between "browsers" and "When" with -- . --.

Column 5,
Line 58, replace "utilized" with -- utilize --.

Column 7,
Line 60, replace "location;" with -- locations; --
Line 63, replace "vary" with -- varying --.

Column 11,
Line 12, insert -- a -- between "accepting" and "designation"

Column 12,
Line 32, replace "comprising;" with -- comprising: --.

Signed and Sealed this

Sixth Day of July, 2004

JON W. DUDAS
*Acting Director of the United States Patent and Trademark Office*